United States Patent
Inturi et al.

(10) Patent No.: US 11,739,002 B2
(45) Date of Patent: Aug. 29, 2023

(54) NON-METAL DOPED METAL OXIDES FORMED USING FLAME SPRAY PYROLYSIS

(71) Applicants: Siva Nagi Reddy Inturi, Cincinnati, OH (US); Thirupathi Bonningari, Cincinnati, OH (US); Makram Suidan, Cincinnati, OH (US); Panagiotis G. Smirniotis, Cincinnati, OH (US)

(72) Inventors: Siva Nagi Reddy Inturi, Cincinnati, OH (US); Thirupathi Bonningari, Cincinnati, OH (US); Makram Suidan, Cincinnati, OH (US); Panagiotis G. Smirniotis, Cincinnati, OH (US)

( * ) Notice: Subject to any disclaimer, the term of this patent is extended or adjusted under 35 U.S.C. 154(b) by 482 days.

(21) Appl. No.: 16/707,596

(22) Filed: Dec. 9, 2019

(65) Prior Publication Data

US 2020/0180973 A1    Jun. 11, 2020

Related U.S. Application Data

(60) Provisional application No. 62/777,522, filed on Dec. 10, 2018.

(51) Int. Cl.
| | |
|---|---|
| *C01G 23/07* | (2006.01) |
| *C01G 23/08* | (2006.01) |
| *B01J 21/06* | (2006.01) |
| *B01J 35/00* | (2006.01) |
| *B82Y 40/00* | (2011.01) |
| *B82Y 30/00* | (2011.01) |
| *B01J 37/34* | (2006.01) |

(52) U.S. Cl.
CPC ............ *C01G 23/07* (2013.01); *C01G 23/08* (2013.01); *B01J 21/063* (2013.01); *B01J 35/004* (2013.01); *B01J 37/349* (2013.01); *B82Y 30/00* (2013.01); *B82Y 40/00* (2013.01); *C01P 2002/84* (2013.01); *C01P 2004/64* (2013.01)

(58) Field of Classification Search
CPC ..... C01G 23/07; C01G 23/08; C01P 2004/64; B82Y 30/00; B82Y 40/00
See application file for complete search history.

(56) References Cited

PUBLICATIONS

Michael Assibey, "Flame spray pyrolysis of pure and doped TiO2 nanoparticles for waste water treatment", MSC thesis, U. Eastern Finland, publicly available in May 2016.*
Siva Nagi Reddy Inturi, Ph.D. Dissertation, University of Cincinnati, accessible to public on Nov. 7, 2017.*

* cited by examiner

*Primary Examiner* — Yong L Chu

(57) ABSTRACT

Methods of forming non-metal doped metal oxide nanoparticles using a flame spray pyrolysis process are described. The non-metal doped metal oxide nanoparticles exhibit high photocatalytic activity. Specific non-metal doped metal oxides nanoparticles which can be formed by the described processes include nitrogen-doped titanium dioxide and sulfur-doped titanium dioxide.

19 Claims, 6 Drawing Sheets

NON-METAL DOPED METAL OXIDES FORMED USING FLAME SPRAY PYROLYSIS

CROSS-REFERENCE TO RELATED APPLICATIONS

The present application claims the priority of U.S. provisional patent application Ser. No. 62/777,522, entitled NON-METAL DOPED METAL OXIDES FORMED USING FLAME SPRAY PYROLYSIS, filed Dec. 10, 2018, and hereby incorporates the same application herein by reference in its entirety.

TECHNICAL FIELD

The present disclosure generally relates to the formation of non-metal doped metal oxides using a flame spray pyrolysis process.

BACKGROUND

Certain metal oxides, such as titanium dioxide ($TiO_2$), have been proposed for use as a photocatalyst as such compounds resist corrosion, are non-toxic, and exhibit physical and chemical stability. As a photocatalyst, metal oxides would provide an advantageous, low-cost, option to degrade volatile organic compounds and to form self-cleaning coatings and anti-microbial coatings. However, unmodified metal oxides exhibit limited photocatalytic activity. To improve the photocatalytic effectiveness of metal oxides, it is known to dope the metal oxide with a cation to optimize the band gap and improve photocatalytic sensitivity. Such doped metal oxides suffer, however, from low thermal stability, enhanced recombination of charge carriers, and high cost.

SUMMARY

According to another embodiment, a method of making non-metal doped metal oxide particles includes forming a precursor composition, atomizing the precursor composition, and igniting the atomized precursor composition in a flame spray apparatus to form non-metal doped metal oxide particles. The precursor composition is formed by: reacting a metal oxide precursor and a non-metal dopant in a solvent to form a metal compound; and adding a fuel source to the metal compound and solvent to form a precursor composition. The metal compound and the fuel source are soluble in the solvent.

DETAILED DESCRIPTION

Figure 1:
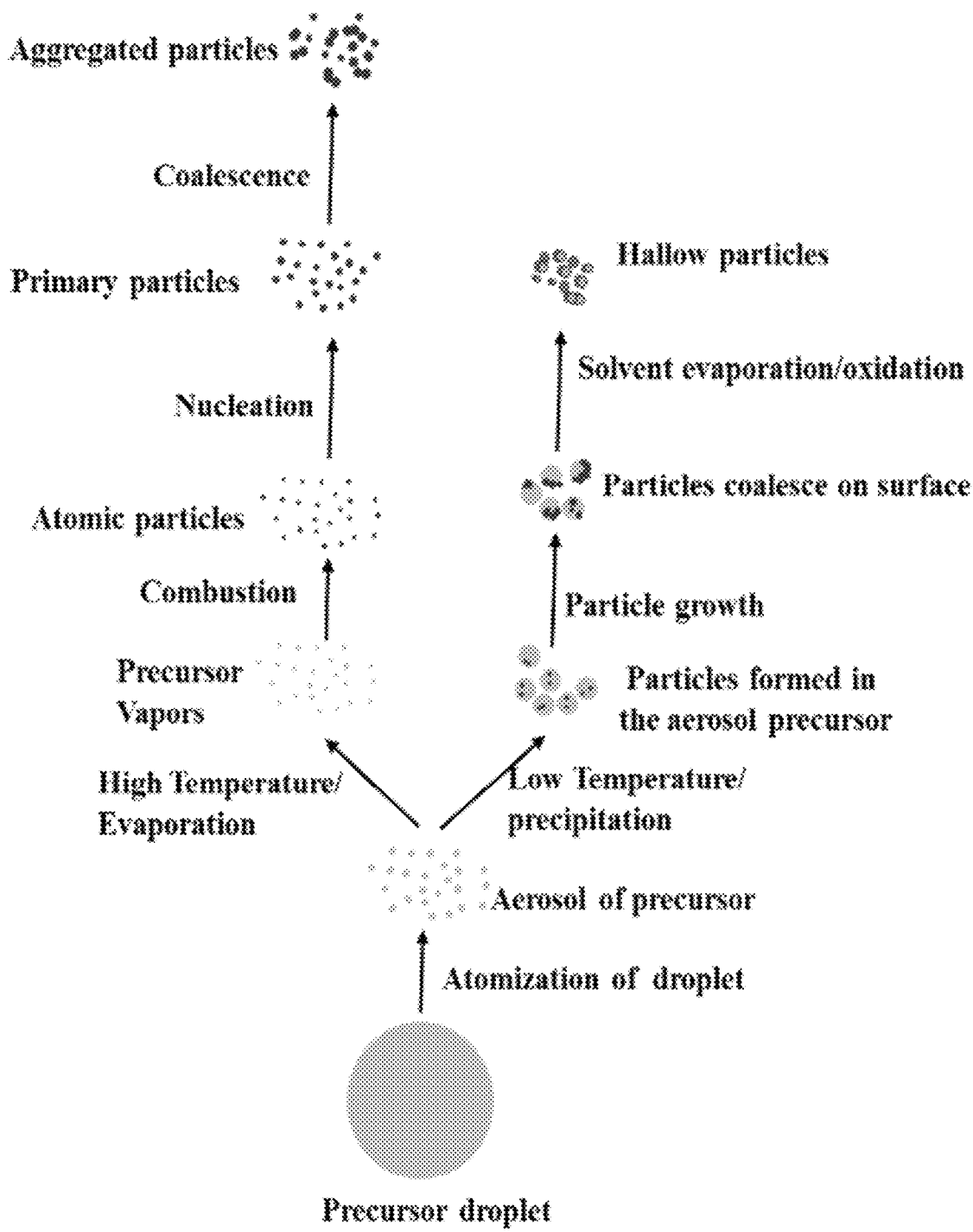
FIG. 1 depicts a diagram illustrating the evolution of metal oxide nanoparticles in a flame spray pyrolysis process according to one embodiment.

The present disclosure is generally related to the doping of metal oxides with non-metal elements using a novel flame spray pyrolysis process. The flame spray pyrolysis process described herein has been found to facilitate the incorporation of desirable amounts of non-metal elements, including nitrogen and sulfur, into a metal oxide nanoparticle. Such non-metal doped metal oxide nanoparticles can exhibit desirable properties including enhanced photocatalytic activity.

As will be appreciated, the use of the novel flame spray pyrolysis process can exhibit a number of advantages over known methods used to produce non-metal doped metal oxides. For example, known processes such as dip calcination processes, sol-gel processes, ion implantation processes, annealing under ammonia gas processes, sputtering processes, electrochemistry processes, hydrothermal processes, solvo-thermal processes, ball milling processes, and oxidation of titanium nitride processes require complex syntheses, are costly, and do not easily scale to desired volume production. In contrast, the flame spray pyrolysis processes described herein provide a single step process for the synthesis of non-metal doped metal oxides. The flame spray pyrolysis process can produce non-metal doped metal oxides at scale in a green and cost effective process.

Generally, the flame spray pyrolysis processes described herein involve the formation of a precursor composition and subsequent combustion of the precursor composition in a flame spray apparatus. The precursor composition includes at least solvent, a fuel source, and a doped metal oxide precursor. As used herein, the doped metal oxide precursor refers to any compound that forms non-metal doped metal oxide nanoparticles when combusted under suitable conditions. In turn, a metal oxide precursor refers to any compound that forms a metal oxide when combusted under suitable conditions. The doped metal oxide precursor can be formed from the metal oxide precursor.

As can be appreciated, there are a variety of suitable metal oxide precursors depending upon the metal oxide that is to be formed. For example, a metal oxide precursor to form titanium dioxide ("$TiO_2$") can be titanium tetraisopropoxide. Combustion of titanium tetraisopropoxide in a flame spray apparatus forms titanium dioxide. Examples of other suitable titanium dioxide precursors can include titanium tetrachloride, titanium oxynitrate, and titanium(IV) bis(ammonium lacto). As can be appreciated, other metal oxide precursors can be used to alternatively form metal oxides of Be, Mg, Ca, Sr, Ba, Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Al, Ga, In, Si, Ge, Sn, Pd, As, Sb, Bi, Se and Te.

For use in a flame spray apparatus, it can be advantageous for the metal oxide precursor or the doped metal oxide precursor to be soluble in the precursor composition. As can be appreciated however, certain insoluble metal oxide precursors can be formed into soluble doped metal oxide precursors. For example, although titanium tetraisopropoxide is insoluble in an aqueous precursor composition, it can be reacted with an inorganic acid, such as nitric or sulfuric acid, to form a doped metal oxide precursor which is soluble in an aqueous precursor composition.

Generally, suitable doped metal oxide precursors can be formed by reacting a metal oxide precursor with a compound containing the desired dopant. For example, suitable doped metal oxide precursors which form non-metal doped titanium dioxide can be formed by reacting titanium tetraisopropoxide with a suitable compound to form a soluble compound. For example, in certain embodiments, titanium tetraisopropoxide can be titrated with nitric acid to form water-soluble titanium nitrate.

In such embodiments, the precursor composition can include a suitable fuel source, water as a solvent, and titanium nitrate. The titanium nitrate can be prepared, in solution, by adding titanium tetraisopropoxide to the water, titrating with nitric acid until no precipitate remains, and then adding fuel. The order of the steps can be rearranged in various embodiments. For example, the precursor composition can include water and fuel before the addition of titanium tetraisopropoxide and nitric acid.

As can be appreciated, other metal nitrates can be used a doped metal oxide precursor and such metal nitrates can be used to form other nitrogen-doped metal oxide nanoparticles.

The metal oxide precursors can be reacted with a variety of other compounds containing the desired dopant. For example, the metal oxide precursors can generally be reacted with other inorganic acids, such as sulfuric acid, to form suitable doped metal oxide precursors in certain embodiments. Use of sulfuric acid can form sulfur-doped metal oxide nanoparticles. As can be appreciated however, any compound which results in a soluble doped metal oxide precursor and which includes the desired dopant can be suitable. Generally, the desired doped metal oxide precursor can be formed by titrating the metal oxide precursor with the selected compound until the doped metal oxide precursor is fully dissolved in solution. As can be appreciated, the dopant can be nitrogen, carbon, sulfur, fluoride, boron, chloride, bromide, iodide, or phosphorous in various embodiments.

Examples of suitable compounds which can be reacted with a metal oxide precursor to form a doped metal oxide precursor include urea, nitric acid, ethylenediamine, ammonia, diethylenetriamine, triethyl amine, diethanolamine, ammonium nitrate, hexamine, aniline, butadiene, nitro methane, acrylamide, ammonium carbonate, thiourea, sulfuric acid, sodium iodide, boric acid, iodic acid, D-glucose, phosphoric acid, phosphoric acid, hydrofluoric acid, NaF, $NH_4F$, triflouro-acetic acid, potassium iodate ($KIO_3$), sodium bromate ($NaBrO_3$), ammonium bromide ($NH_4Br$), potassium iodide, boric acid triethyl ester, hydrochloric acid, polyethylene glycol, tetrabutylammonium, oleic acid ($C_{18}H_{34}O_2$), derivatives thereof, and combinations thereof.

In certain embodiments, the dopant can advantageously be nitrogen. As can be appreciated, nitrogen has a comparable atomic size to oxygen, has a small ionization energy, and is expected to remain stable under a wide range of conditions. Additionally, the incorporation of nitrogen in titanium dioxide can narrow the bandgap energy by raising the valence band of titanium dioxide and can reduce the rate of recombination of photogenerated electron holes. As can be appreciated, such features can facilitate improved photocatalytic activity under visible light. Nitrogen-doped titanium dioxide can have a bandgap of about 3 eV or less in certain embodiments, about 2.9 eV or less in certain embodiments, about 2.8 eV or less in certain embodiments, about 2.7 eV or less in certain embodiments, and a bandgap of about 2.4 eV to about 2.65 eV in certain embodiments. In certain embodiments, nitrogen-doped titanium dioxide formed using the methods described herein can include about 1.5% to about 1.7% nitrogen, by atomic percentage and can have a particle size of about 20 nm to about 150 nm.

As a further example, a doped metal oxide precursor which forms sulfur-doped titanium dioxide can be formed by titrating titanium isopropoxide with sulfuric acid. Such titration can form titanium oxysulfate. Sulfur-doped titanium dioxide can have a bandgap of about 2.75 eV to about 3 eV. In certain embodiments, sulfur-doped titanium dioxide formed using the methods described herein can include about 4% to about 10% sulfur, by atomic percentage.

Generally, the solvent included in a precursor combination can be any solvent in which the doped metal oxide precursor is soluble in. In certain embodiments, the solvent can advantageously be water as water is an excellent solvent for a variety of doped metal oxide precursors, and because water lowers the combustion temperature of a flame spray pyrolysis process. However, other solvents including inorganic non-aqueous solvents can alternatively be used. For example, the solvent can be liquid ammonia, liquid sulfur dioxide, sulfuryl chloride, sulfuryl chloride fluoride, phosphoryl chloride, dinitrogen tetroxide, antimony trichloride, bromine pentafluoride, hydrogen fluoride, or an inorganic acid in certain embodiments. Organic solvents can alternatively be used but may result in undesirably high combustion temperatures.

The fuel source can generally be any liquid which burns in a flame spray apparatus. For example, organic alcohols and liquefied petroleum products can be used. In certain embodiments, the fuel source can be ethanol.

The precursor composition, including the fuel source, solvent, and the doped metal oxide precursor, can be combusted in a flame spray to form non-metal doped metal oxide nanoparticles.

An illustration of the reactions that are theorized to occur in a flame spray process is depicted in FIG. 1.

As depicted in FIG. 1, the flame spray pyrolysis process involves atomization of a droplet of the precursor composition into an aerosol spray which is combusted. In a high temperature flame spray pyrolysis process (e.g., a flame spray without water or other mechanism to reduce the temperature of the process), the combustion process produces atomic particles which grow through nucleation and coalescence to form aggregated particles having a particle size of about 20 nm. To improve incorporation of the dopant however, the temperature of the flame spray pyrolysis process can be controlled in certain embodiments.

As can be appreciated, the temperature can be controlled by variations in the flame spray apparatus, the type and flow rate of the fuel, inclusion of non-combustible components in the precursor composition such as water, or by a combination of such variations.

In such embodiments lowering the temperature of combustion, the non-metal doped metal oxides nanoparticles can be formed by the low temperature process depicted in FIG. 1. In the low temperature process, the aerosolized precursor composition is theorized to precipitate particles of the doped metal oxide in the aerosol particles. The precipitates in these particles coalesce on the surface of the aerosol particle and evaporation and/or oxidation of the solvent results in the formation of hollow non-metal doped metal oxide nanoparticles having a particle size of about 30 nm to about 150 nm. It is theorized that lowering the temperature of combustion can improve incorporation of the non-metal dopant. For example, it is believed that at greater temperatures nitrogen would oxidize to $NO_x$ rather than be incorporated into the metal oxide. As used herein, a low temperature flame spray process means a temperature of combustion from about 1000° C. to about 2000° C.; in certain embodiments, from about 1100° C. to about 1750° C.; and in certain embodiments, from about 1200° C. to about 1500° C.

In certain embodiments, the precursor composition can include a non-combustible component to lower the temperature of combustion. For example, in certain embodiments, the solvent of the precursor composition can be water. As can be appreciated, in addition to lowering the temperature of combustion, water also acts as an advantageous solvent to form the doped metal oxide precursor compounds.

In certain embodiments, about 10% to about 90% of the precursor composition can be water including any quantities between about 10% to about 90% water such as about 25% to about 75% water. In certain embodiments, about 50% of the precursor composition can be water.

In certain embodiments, the precursor composition can further include secondary dopant sources. Secondary dopant sources can provide a further source of the non-metal which can increase the amount of non-metal incorporated into the doped metal oxide. For example, increased quantities of nitrogen can be incorporated into a metal oxide by including one or more of urea, ammonia, pyridine, hydrazine, an amine compound, an azide compound, a nitrile compound, acetamide ($C_2H_5NO$), cyanamide ($NCNH_2$), hexamine/hexamethylene tetramine (($CH_2)_6N_4$), ammonium carbonate (($NH_4)_2CO_3$), ammonium chloride ($NH_4Cl$), ammonium nitrate ($NH_4NO_3$), n-butylamine ($C_4H_{11}N$), or derivatives thereof into the precursor combination. As can be appreciated, other soluble compounds can aid in the incorporation of other elements. Generally, any secondary dopant sources can be suitable if it is soluble in the precursor composition.

In certain embodiments, non-metal doped metal oxides can be formed by use of a precursor composition which includes a soluble metal oxide precursor, a solvent, a fuel source, and a secondary dopant. In such embodiments, the metal oxide precursor is not modified to include a dopant.

As can be appreciated, the non-metal doped metal oxides formed using the methods described herein can be useful for a variety of applications. For example, the non-metal doped metal oxides can be useful for visible light photocatalysis of organic pollutants. Additionally, the non-metal doped metal oxides can be useful for organic syntheses, solar cells, cancer therapy, cathode corrosion protection ceramic materials, antifogging glass, self-cleaning materials, and anti-microbial materials. In certain embodiments, the nanoparticles can be processed into sheets, blocks, or other forms as desired.

Examples

Experimental Procedures and Characterization

Characterization

Non-metal doped metal oxide nanoparticles were characterized using standard techniques including by powder x-ray diffraction using a Phillips Xpert diffractometer with a nickel-filtered CuKα (wavelength 0.154056 nm) radiation source; Brunauer-Emmett-Teller ("BET") surface area calculations using a Micromeritics ASAP 2010 and a scintillation detector; transmission emission spectra using a Philips CM 20 electron microscope at a voltage of 200 keV and a resolution of 0.27 nm; raman spectroscopy using a Bruker FRA 106/S FT-Raman spectrometer with an InGaAs detector; UV-vis spectroscopy using a Shimadzu 2501 PC spectrometer; thermogravimetric analysis using a Perkin Elmer Pyris™-1 thermogravimetric analyzer and Perkin Elmer thermal analysis gas station; and by x-ray photoelectron spectroscopy (XPS) using a Pyris-VG thermo scientific X-ray photoelectron spectrometer system with a fixed analyzer transmission mode with pass energies of 89.45 eV and 35.75 eV. Summarized characterizations are provided in Tables 1 to 2

Photocatalytic Degradation of Phenol

Oxidation of phenol performed was performed in a batch round reactor. Acrylic Op-2 sheets were employed to filter the ultraviolet section of the radiation of the light source. 6 lamps (F8T5 ww) surrounding the reactor were used as the light source. The jacket surrounding the photo-reactor were used for cooling lamp, to efficiently exclude the infra-red spectrum of the light source, and to sustain the temperature of the reaction (25° C.). For the evaluation, 400 mg of the Example non-metal doped metal oxide was combined with 500 ml reactant solution and 500 μm phenol and oxygenated at 0.5 L $min^{-1}$. At each sample interval, the suspended reaction samples were collected by using a syringe and the collected samples were filtered through syringe filters (Cameo 25 P polypropylene, OSMONICS, Cat #DDP02T2550). The filtered sample solutions were analyzed with the assistance of a Shimadzu TOC-VCSH analyzer (total organic carbon analyzer).

Photocatalytic Degradation of Acetaldehyde

Photocatalytic degradation of acetaldehyde was carried out in a semi-batch process with batch aqueous solution and continuous oxygen flow in a round, flat-plate reactor. To eliminate ultraviolet radiation while conducting the visible light experiment a double acrylic OP-2 (Museum quality) sheet was placed between the light source and the reactor. Six F8T5 ww lamps surrounding the reactor. To successfully prevent the IR part of the spectrum from influencing the reaction, a cooling jacket was placed around the reactor. The reaction temperature in the reactor for the analysis was maintained at 25±2° C. For the reaction, 500 mg of the metal oxide was mixed with 500 mL of 500 μm acetaldehyde in the reactor. No additional solution was added to alter the pH of the reactant solution. A continuous flow of 500 mL/min of oxygen (Wright Brothers, 99.9%) was bubbled through the reactor. Samples were collected in dark and later with light and collected with the help of syringe. The collected sample was filtered for the catalyst with Cameo 25 P polypropylene (OSMONICS, Cat #DDP02T2550) syringe filters. The filtered clear solutions were analyzed by total organic carbon analyzer (TOC-VCSH, Shimadzu).

Nitrogen-Doped Titanium Dioxide Examples

Example nitrogen-doped titanium dioxide nanoparticles were formed using a flame spray pyrolysis process. Examples were formed by slowly mixing titanium tetraisopropoxide in cold deionized water to form a solution of 0.3 M titanium tetraisopropoxide. After stirring for 30-60 minutes, nitric acid was added dropwise. Varying concentrations of nitric acid were used (0.8M-4M). Ethanol was mixed into the solution to form the precursor composition with ethanol making up 50% of the precursor composition. The precursor composition was fed through a spray nozzle at a flow rate of 3 mL $min^{-1}$ using a syringe pump (Cole Parmer, 74900 series), where it was dispersed by a surrounding 5 L min$^{-1}$ flow of $O_2$ (1.5 bar, Wright Brothers, 99.98%). Combustion of the dispersed droplets was ignited by a surrounding supporting flame (premixed 1.0 L min$^{-1}$ $O_2$/1.0 L min$^{-1}$ $CH_4$). Additional 3 L/min sheath $O_2$ (BOC Gases) was issued through the outer most sintered metal ring. Fine aerosol nanoparticles leaving the flame were collected on a flat glass fiber filter (Whatman GF/A, 150 mm in diameter) aided by a vacuum pump (Grainger Inc.). The aerosol nanoparticles were scraped from the filter for direct use as catalyst without any further treatment. Further examples of nitrogen-doped titanium dioxide nanoparticles were formed using a secondary nitrogen source. Such examples were formed through the addition of urea to the precursor.

Pure (undoped) $TiO_2$ was formed as a comparative example by flame spray pyrolysis of titanium tetraisopropoxide. The titanium tetraisopropoxide was mixed with ethanol solvent to form a 0.3 M solution of titanium tetraisopropoxide in ethanol.

Each nitrogen-doped titanium dioxide example is described using the notation of X—YN—$TiO_2$ for the precursor composition, where Y is the molar concentrations of nitric acid and X is the molar concentration of urea used to form the precursor composition. For example, 2-1N-$TiO_2$ refers to a nitrogen-doped titanium dioxide nanoparticle formed using a precursor composition with 1 M nitric acid and 2 M urea.

Table 1 depicts a listing of characteristics of various example nitrogen-doped titanium dioxide nanoparticles as well as a comparative non-doped titanium dioxide example. Each example was found to be an isotherm type IV using IUPAC nomenclature. Table 1 includes the percent anatase, the atomic percentage of nitrogen (%) and the bandgap energy (eV).

TABLE 1

| Examples | Precursor Composition | $X_{Anatase}$ (%) | N (Atomic %) | Bandgap Energy (eV) |
|---|---|---|---|---|
| Comparative | FSP $TiO_2$ | 81 | — | 3.11 |
| 1 | 0.8N—$TiO_2$ | 57 | 0.09 | 2.96 |
| 2 | 1N—$TiO_2$ | 62 | 0.11 | 2.95 |
| 3 | 1.5N—$TiO_2$ | 61 | — | 2.94 |
| 4 | 2N—$TiO_2$ | 62 | 0.15 | 2.91 |
| 5 | 2.5N—$TiO_2$ | 55 | — | 2.9 |
| 6 | 3N—$TiO_2$ | 57 | 0.13 | 2.89 |
| 7 | 4N—$TiO_2$ | 63 | — | 2.89 |
| 8 | 0.25-1N—$TiO_2$ | 60 | 0.20 | 2.67 |
| 9 | 0.5-1N—$TiO_2$ | 65 | 0.46 | 2.61 |
| 10 | 0.75-1N—$TiO_2$ | 60 | 0.59 | 2.58 |
| 11 | 1-1N—$TiO_2$ | 60 | 0.97 | 2.68 |
| 12 | 1-1.5N—$TiO_2$ | 59 | 0.40 | 2.53 |
| 13 | 1-2N—$TiO_2$ | 58 | 0.35 | 2.53 |
| 14 | 1.5-1N—$TiO_2$ | 63 | 1.07 | 2.53 |
| 15 | 2-1N—$TiO_2$ | 58 | 1.62 | 2.51 |
| 16 | 2.5-1N—$TiO_2$ | 65 | 1.16 | 2.49 |
| 17 | 3-1N—$TiO_2$ | 62 | 1.27 | 2.47 |

As depicted by Table 1, examples 1-7, formed without a secondary nitrogen source, had relatively low amounts of atomic nitrogen (0.11% to 0.13%) incorporated into the titanium dioxide while examples 8-17, including a secondary nitrogen source, had significantly greater amounts of atomic nitrogen. Incorporation of greater amounts of nitrogen significantly lowered the bandgap energy.

Figure 2A:
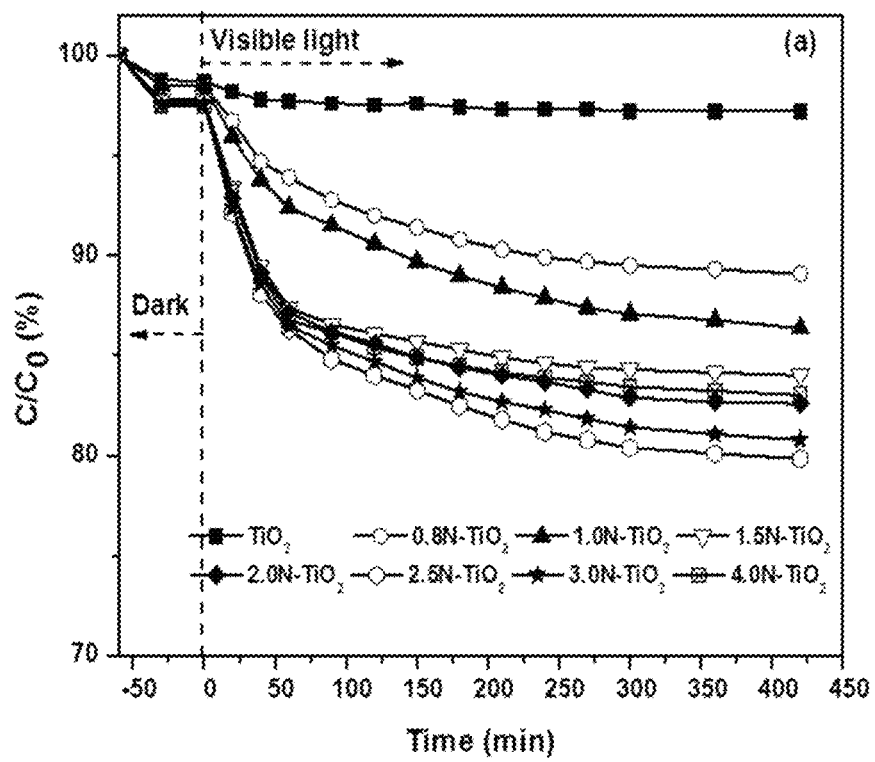
FIGS. 2A and 2B depict graphs showing the photocatalytic conversion of phenol by nitrogen-doped titanium dioxide nanoparticles.
Figure 2B:
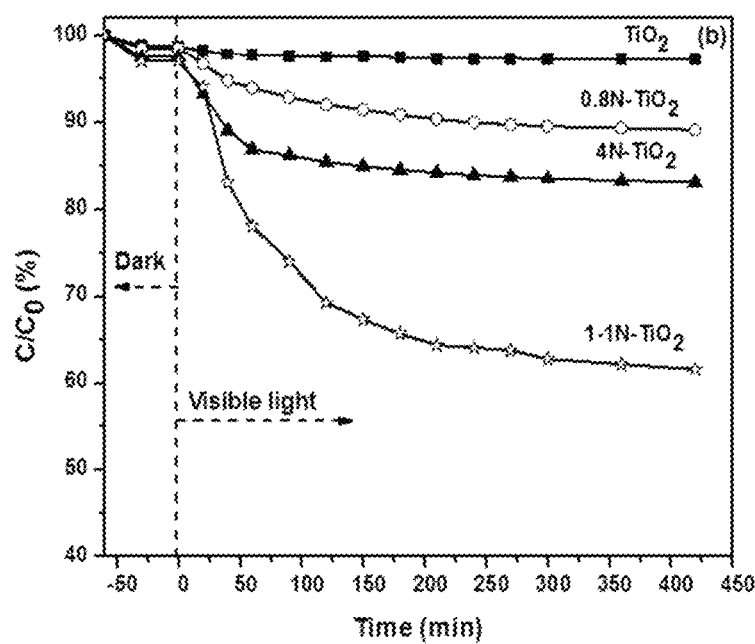

FIGS. 2A and 2B depict the conversion of 500 m of phenol according to the method described herein for the Photocatalytic Degradation of Phenol. As seen by the improvement in photocatalytic activity with incorporation of greater amounts of nitrogen, the incorporation of nitrogen has altered the band structure or suppressed the recombination efficiency of the photo-generated electron-hole pairs resulting in enhanced photocatalytic efficiency.

Figure 3A:
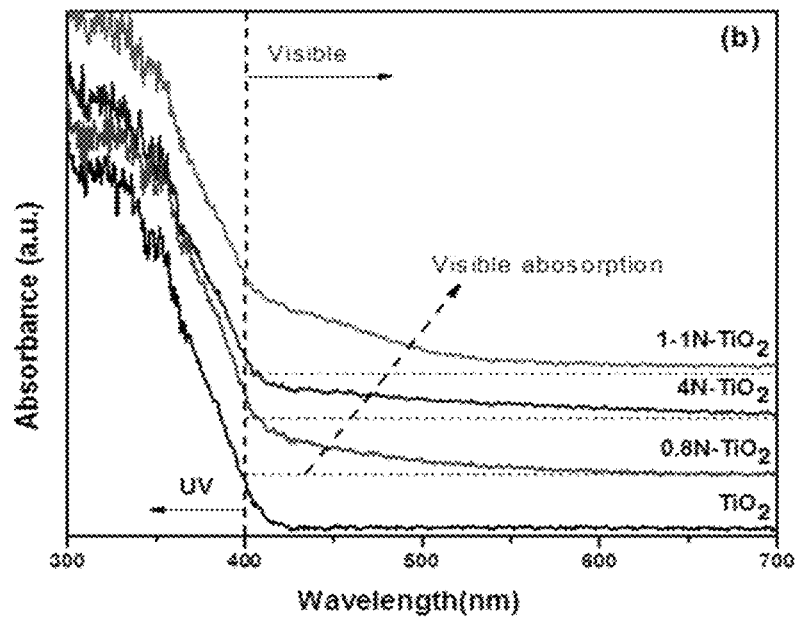
FIGS. 3A and 3B depict UV-vis diffuse reflectance spectra for nitrogen-doped titanium dioxide nanoparticles.
Figure 3B:
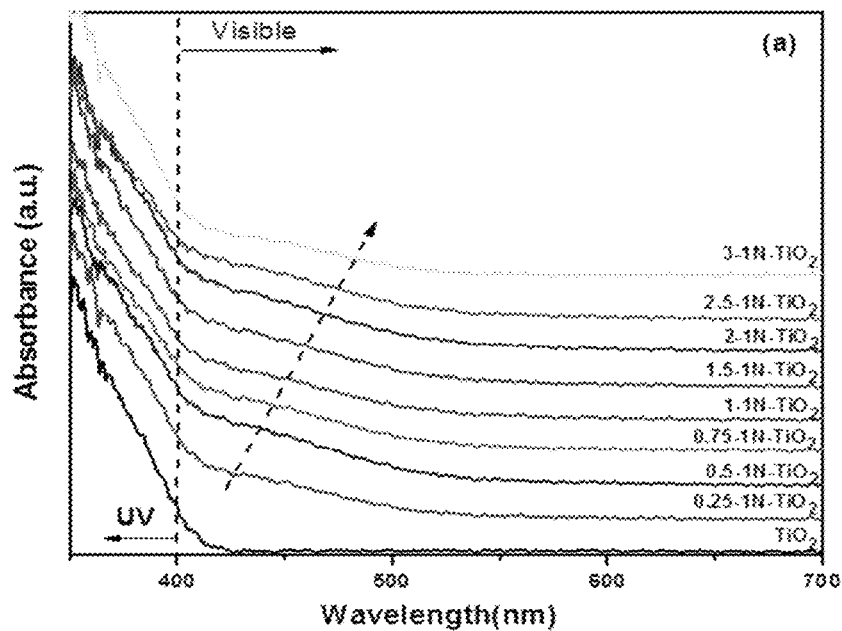

FIGS. 3A and 3B depict UV-vis diffuse reflectance spectra of several examples. As depicted by FIGS. 3A and 3B, there was a significant increase in visible light absorption for examples incorporating a greater amount of nitrogen.

Figure 4:
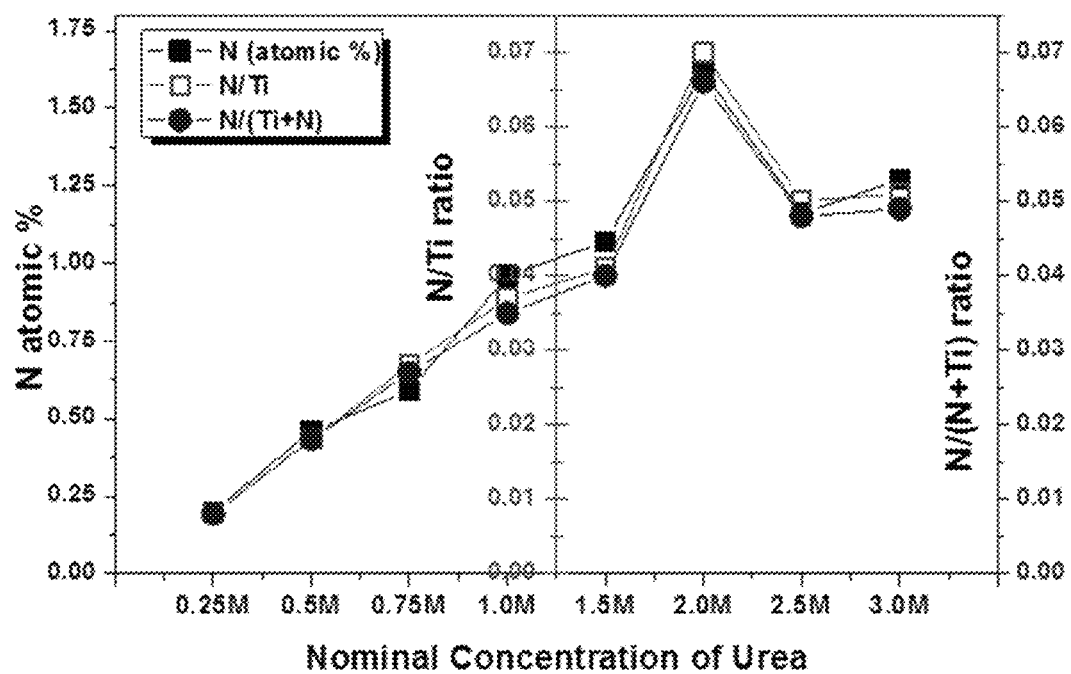
FIG. 4 depicts a graph showing the change in atomic percentage of nitrogen in nitrogen-doped titanium dioxide nanoparticles varies as the molar concentration of secondary nitrogen in a precursor composition is varied.

FIG. 4 depicts a graph showing how the atomic percentage of nitrogen for certain examples varies depending on the molar concentration of the secondary nitrogen source. As depicted by FIG. 4, a peak is observed when 2 M urea is used with 1 M nitric acid.

Figure 5:
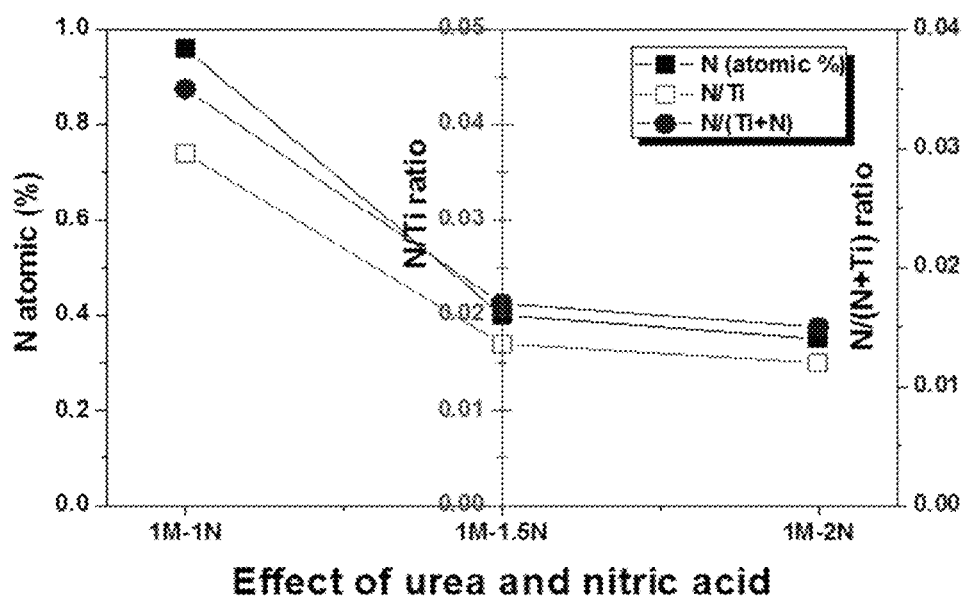
FIG. 5 depicts a graph showing the change in atomic percentage of nitrogen in nitrogen-doped titanium dioxide nanoparticles varies as the molar concentration of the dopant in a precursor composition is varied.

FIG. 5 depicts a graph showing how the atomic percentage of nitrogen varies depending on the molar concentration of nitric acid. As depicted by FIG. 5, a peak is observed when 1 M nitric acid is used.

Figure 6:
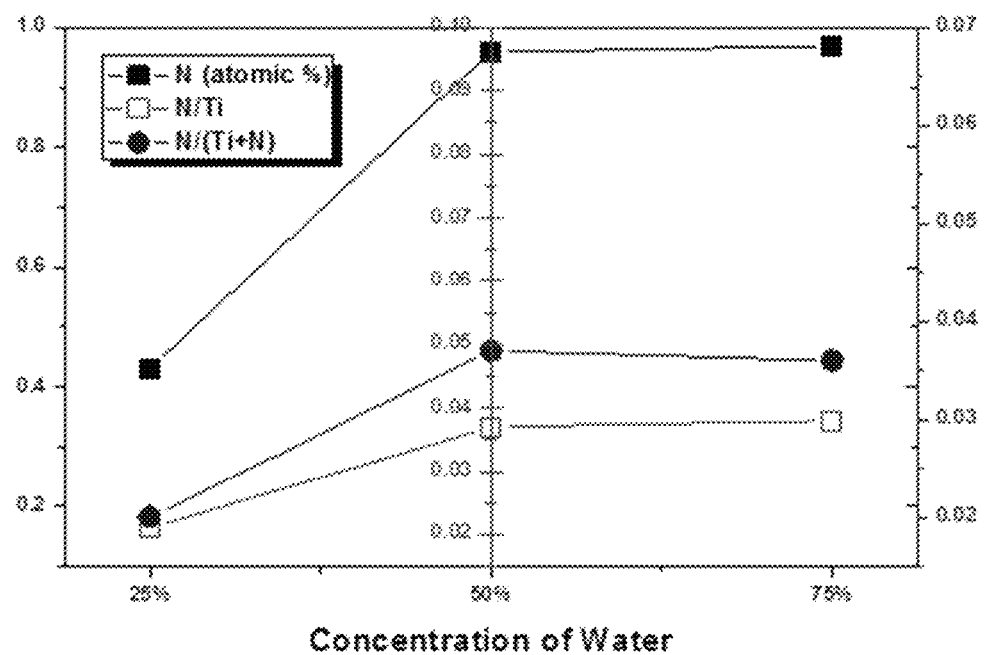
FIG. 6 depicts a graph showing the change in atomic percentage of nitrogen in nitrogen-doped titanium dioxide nanoparticles varies as the water content of a precursor composition is varied.

FIG. 6 depicts a graph illustrating how the atomic percentage of nitrogen varies based on the amount of water included in the precursor composition. Each of the examples used precursor compositions formed of 1 M nitric acid and 1 M urea. As depicted by FIG. 6, examples formed with 50% or more water incorporated significantly more nitrogen than an example formed with only 25% water. The peak incorporation occurred with 50% water in the precursor composition.

Sulfur-Doped Titanium Dioxide Examples

Example sulfur-doped titanium dioxide nanoparticles were formed using a flame spray pyrolysis process. Examples were formed by slowly mixing titanium tetraisopropoxide in cold deionized water to form a solution of 0.3 M titanium tetraisopropoxide. After stirring for 30-60 minutes, sulfuric acid was added dropwise. Varying concentrations of sulfuric acid were used (1M-3M). Ethanol was mixed into the solution to form the precursor composition with ethanol making up 50% of the precursor composition. The precursor composition was fed through a spray nozzle at a flow rate of 3 mL min$^{-1}$ using a syringe pump (Cole Parmer, 74900 series), where it was dispersed by a surrounding 5 L min$^{-1}$ flow of $O_2$ (1.5 bar, Wright Brothers, 99.98%). Combustion of the dispersed droplets was ignited by a surrounding supporting flame (premixed 1.0 L min$^{-1}$ $O_2$/1.0 L min$^{-1}$ $CH_4$). Additional 3 L/min sheath $O_2$ (BOC Gases) was issued through the outer most sintered metal ring. Fine aerosol nanoparticles leaving the flame were collected on a flat glass fiber filter (Whatman GF/A, 150 mm in diameter) aided by a vacuum pump (Grainger Inc.). The aerosol nanoparticles were scraped from the filter for direct use as catalyst without any further treatment.

Pure (undoped) $TiO_2$ was formed as a comparative example by flame spray pyrolysis of titanium tetraisopropoxide. The titanium tetraisopropoxide was mixed with ethanol solvent to form a 0.3 M solution of titanium tetraisopropoxide in ethanol.

Each example sulfur-doped titanium dioxide example is described using a notation of XS $TiO_2$ for the precursor composition, where X is the molar concentration of sulfuric acid. For example, 2S $TiO_2$ refers to a sulfur-doped titanium dioxide nanoparticle formed using 2 M sulfuric acid.

Table 2 depicts a listing of characteristics of various example sulfur-doped titanium dioxide nanoparticles as well as a comparative non-doped titanium dioxide example. Table 2 specifically depicts the percent anatase, the atomic percentage of sulfur (%), and the bandgap energy (eV).

TABLE 2

| Examples | Precursor Composition | $X_{Anatase}$ (%) | S (Atomic, %) | Band gap, (eV) |
|---|---|---|---|---|
| Comparative | FSP TiO$_2$ | 81 | 0 | 3.07 |
| 18 | 1S TiO$_2$ | 66 | 4.19 | 2.94 |
| 19 | 1.25S TiO$_2$ | 65 | 6.34 | 2.90 |
| 20 | 1.5 S TiO$_2$ | 62 | 6.65 | 2.88 |
| 21 | 1.75S TiO$_2$ | 62 | 7.91 | 2.85 |
| 22 | 2S TiO$_2$ | 61 | 8.74 | 2.81 |
| 23 | 2.5S TiO$_2$ | 59 | 8.61 | 2.80 |
| 24 | 3S TiO$_2$ | 59 | 5.19 | 2.78 |

Figure 7:
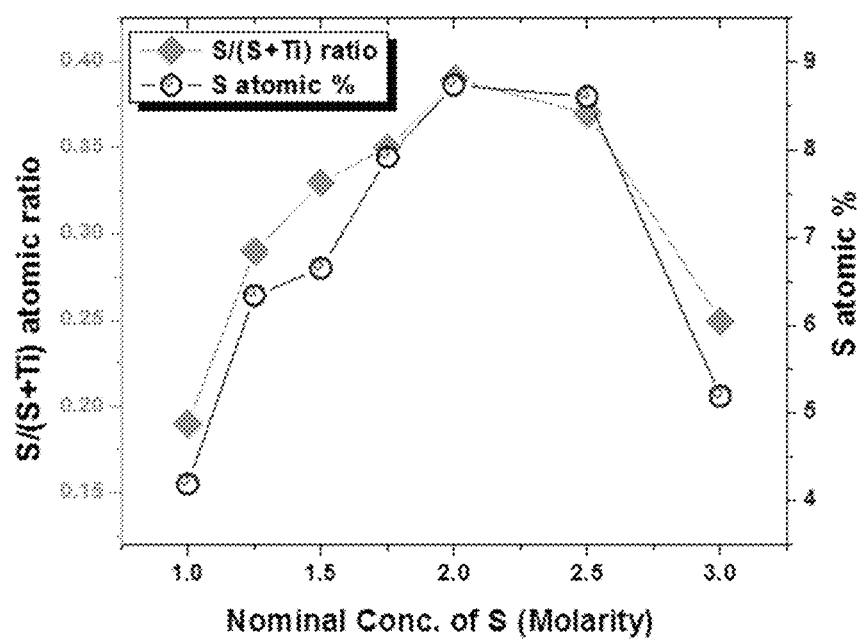
FIG. 7 depicts a graph showing the atomic percentage of sulfur in sulfur-doped titanium dioxide nanoparticles.

FIG. 7 depicts the atomic percentage of sulfur for the examples of Table 2. As indicated by FIG. 7, the atomic percentage of sulfur varied depending on the concentration of sulfuric acid in the precursor composition. The greatest amount of sulfur was incorporated in titanium dioxide when the precursor composition was formed with 2.0 molar sulfuric acid.

Figure 8:
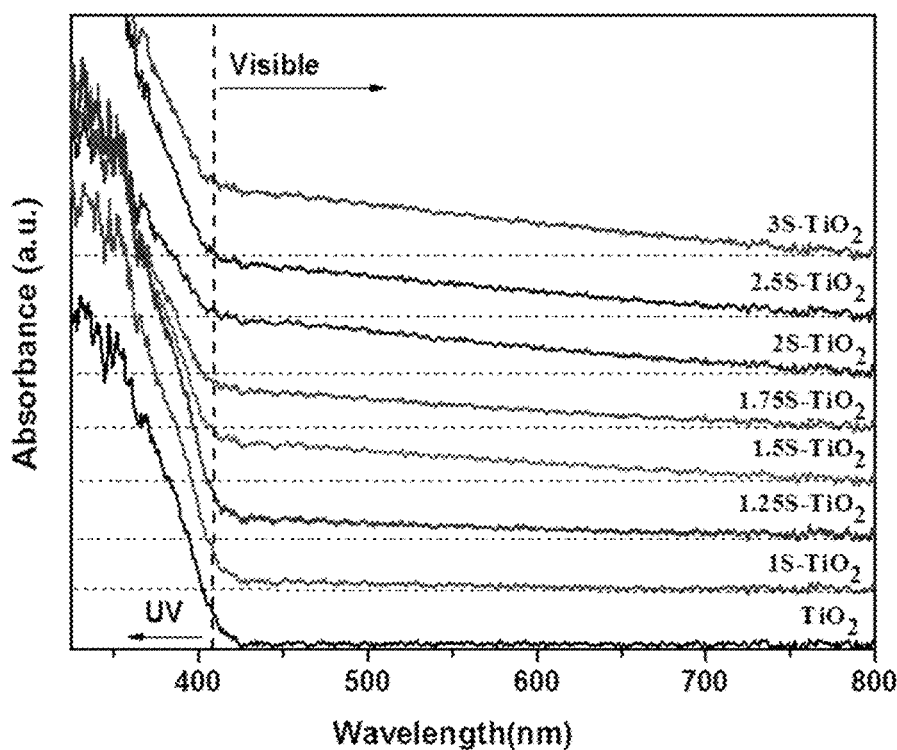
FIG. 8 depicts a UV-vis diffuse reflectance spectra for sulfur-doped titanium dioxide nanoparticles.

FIG. 8 depicts diffuse reflectance spectra of several examples. As depicted by FIG. 8, there was a significant increase in visible light absorption for examples incorporating a greater amount of sulfur.

Figure 9:
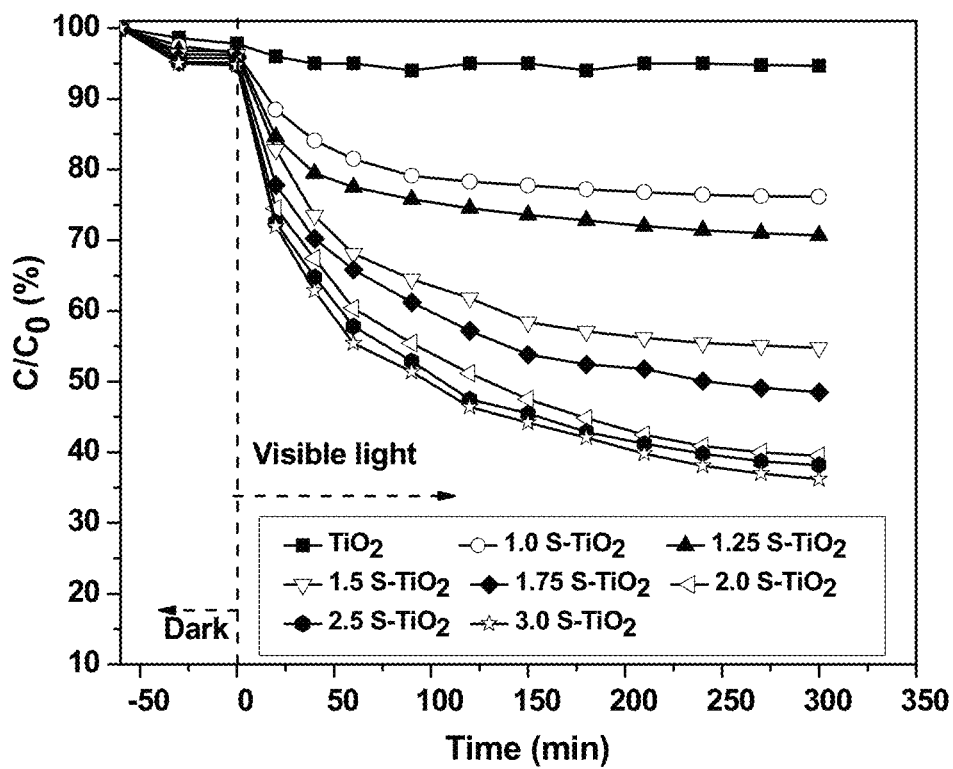
FIG. 9 depicts a graph showing the photocatalytic conversion of acetaldehyde by sulfur-doped titanium dioxide nanoparticles.

FIG. 9 depicts the conversion of 500 m of acetaldehyde according to the method described herein for the Photocatalytic Degradation of Acetaldehyde. Each of the examples shows greater photocatalytic activity than TiO$_2$ with greater photocatalytic activity as sulfur-doping increases.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A method of making non-metal doped metal oxide particles comprising:
   forming a precursor composition comprising:
   reacting a metal oxide precursor and a dopant in a solvent to form a metal compound;
   adding a fuel source to the metal compound and solvent to form a precursor composition; and
   wherein the metal compound and the fuel source are soluble in the solvent;
   atomizing the precursor composition; and
   igniting the atomized precursor composition in a flame spray apparatus to form non-metal doped metal oxide particles at a temperature of combustion from about 1100° C. to about 1750° C., wherein the metal oxide comprises an oxide of one or more of beryllium, magnesium, calcium, strontium, barium, scandium, yttrium, lanthanum, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, aluminum, gallium, indium, silicon, germanium, tin, arsenic, antimony, bismuth, selenium, and tellurium.

2. The method of claim 1, wherein the dopant comprises one or more of urea, nitric acid, ethylenediamine, ammonia, diethylenetriamine, triethyl amine, diethanolamine, ammonium nitrate, hexamine, aniline, butadiene, nitro methane, acrylamide, ammonium carbonate, thiourea, sulfuric acid, sodium iodide, boric acid, iodic acid, D-glucose, phosphoric acid, phosphoric acid, hydrofluoric acid, NaF, NH$_4$F, triflouro-acetic acid, potassium iodate (KIO$_3$), sodium bromate (NaBrO$_3$), ammonium bromide (NH$_4$Br), potassium iodide, boric acid triethyl ester, hydrochloric acid, polyethylene glycol, tetrabutylammonium, and oleic acid (C$_{18}$H$_{34}$O$_2$).

3. The method of claim 1, wherein the non-metal doped metal oxide particles comprise one or more of nitrogen, carbon, sulfur, fluoride, boron, chloride, bromide, iodide, and phosphorous.

4. The method of claim 1, wherein the solvent is water, and wherein the precursor composition comprises about 25% to about 75%, by weight, water.

5. The method of claim 1, wherein the fuel source comprises ethanol.

6. The method of claim 1, wherein the dopant is an inorganic acid and wherein the inorganic acid reacts with the metal oxide precursor to form the metal compound.

7. The method of claim 1, wherein the metal compound comprise metal nitrate.

8. The method of claim 1, wherein the metal compound comprises titanium nitrate, the titanium nitrate formed by titrating a titanium dioxide precursor with nitric acid.

9. The method of claim 8, wherein about 0.1 M to about 0.5 M of titanium tetraisopropoxide is titrated with about 0.5 M to about 4 M of nitric acid.

10. Nitrogen-doped titanium dioxide particles formed from the method of claim 8, the nitrogen-doped titanium dioxide particles each having a bandgap energy of about 3 eV or less.

11. The nitrogen-doped titanium dioxide particles of claim 10 each have a bandgap energy of about 2.4 eV to about 2.65 eV.

12. The nitrogen-doped titanium dioxide particles of claim 10 each comprise about 1.5% to about 1.7% nitrogen, by atomic percentage.

13. The method of claim 8, wherein the precursor composition further comprises a secondary nitrogen source.

14. The method of claim 13, wherein the secondary nitrogen source comprises one or more of urea, ammonia, pyridine, hydrazine, an amine compound, an azide compound, a nitrile compound, and derivatives thereof.

15. The method of claim 13, wherein the secondary nitrogen source comprises urea, and wherein the precursor composition comprises about 0.25 M to about 3 M of the urea.

16. The method of claim 1, wherein the metal compound comprises titanium oxysulfate, wherein the titanium oxysulfate is formed by titrating titanium tetraisopropoxide with sulfuric acid.

17. The method of claim 16, wherein about 0.3 M titanium tetraisopropoxide is titrated with about 1 M to about 3 M sulfuric acid.

18. Sulfur-doped titanium dioxide particles formed from the method of claim 16, and wherein the particles comprise about 4% to about 10% sulfur, by atomic percentage.

19. The sulfur-doped titanium dioxide particles of claim 18 have a bandgap of about 2.75 eV to about 3 eV.

* * * * *